3,277,177
PROCESS FOR THE PRODUCTION OF KETONES
Alan John Maurice Wenham, Sunbury-on-Thames, England, assignor to The British Petroleum Company Limited, London, England, a British joint-stock corporation
No Drawing. Filed Mar. 20, 1963, Ser. No. 266,493
Claims priority, application Great Britain, Apr. 5, 1962, 13,146/62
3 Claims. (Cl. 260—597)

This invention relates to a process for the production of ketones from olefins.

It is known to react olefins with a halogen such as chlorine or bromine in an aqueous medium in such a manner that halohydrins are formed in high yield. Thus, in U.K. patent specification No. 766,848 halohydrins are produced from olefins by reaction with a halogen in an aqueous medium comprising water and an organic liquid miscible with both water and the feed olefin.

It has now been found that certain olefins i.e. of the $R(R_1)C=C(R_2)H$ type where R, $R_1$ and $R_2$ are alkyl groups, can be reacted with a halogen in an aqueous medium to give high yields of the corresponding ketone $R(R_1)C.CO.R_2$. Surprisingly, it has been found that olefins of the $R(H)C=C(H)R_1$ type where R and $R_1$ are alkyl groups, undergo substantially no conversion to the corresponding ketone under analogous reaction conditions.

Accordingly the present invention provides a process for the production of a ketone comprising reacting an olefin of the formula $R(R_1)C=C(R_2)H$ where R, $R_1$ and $R_2$ are alkyl groups with a halogen chosen from chlorine, bromine and iodine, at elevated temperature in the presence of water, and recovering from the reaction products a ketone of formula $R(R_1)C.CO.R_2$, where R, $R_1$ and $R_2$ have the meaning assigned above.

Preferably the halogen used is bromine, and in general only the theoretical amount required for hypobromination of the olefin is used. If desired there may also be present in the reaction medium a water-soluble halide e.g. an alkali metal halide. In one embodiment of the invention bromine is added to the reaction vessel in aqueous sodium bromide.

The molar ratio of water to halogen may vary over a wide range, suitably over the range 300:1 to 50:1. Preferably the reactants are boiled over a period of time, suitably 1-10 hours.

If desired a ketone may be continuously distilled from the reaction mixture; a ketone may be recovered in admixture with water and the mixture subjected to phase separation. Water recovered in the distillation may be returned to the column as reflux.

During the reaction a hydrogen halide is formed and may be recovered in the aqueous residue left after the ketone has been distilled off from the reaction products. The hydrogen halide may be converted to the halogen which may then be recycled to the reaction vessel. Generally the concentration of the hydrogen halide in the aqueous residue is such that in order to achieve an efficient conversion to the halogen, the aqueous residue needs to be concentrated by distillation. Generally such distillation is continued until the residue contains about 5 N hydrogen halide. The concentrated residue is then contated with oxygen and nitrogen oxides at elevated temperatures to achieve conversion to the halogen.

It has been further found advantageous to the operation of the process of the invention, that if the feed olefin is reacted at elevated temperature in the presence of an aqueous solution of a halogen, particularly bromine, the corresponding hydrogen halide and a corresponding alkali metal halide in which the concentrations of the components lie in the following ranges: 0.5-1 mole halogen, 0.5-0.6 N hydrogen halide and 0.4-1 N alkali metal halide, the need to concentrate the aqueous residue as above described is eliminated. Thus the ketone is distilled off from the products and the aqueous residue may be directly oxidised without concentration to effect efficient recovery of the halogen. The oxidised aqueous residue, when halogen is added to make up for the relatively small amount lost to the system, is suitable for recycle for reaction with the feed olefin.

By the process of this invention an olefin $$R(R_1)C=C(R_2)H$$

as hereinbefore defined, and preferably where R, $R_1$ and $R_2$ are alkyl groups having 1 to 4 carbon atoms is converted to the corresponding ketone $R(R_1)C.CO.R_2$.

Thus, in one embodiment of the invention 2-methylpentene-2 is the feed olefin and ethylisopropylketone is recovered from the reaction products.

It will be appreciated that mixtures containing the olefins as hereinbefore defined may be used as feedstock, although it has been found that if the feed contains no linear olefinic material, higher yields may be obtained.

The invention is illustrated but not limited with reference to the following examples.

*Example 1*

A solution consisting of 66.64 grams of bromine in 2000 millilitres of water was added over a period of 1½ hours to a vigorously stirred mixture of 34.45 grams of 91% pure 2-methylpentene-2 in 500 millilitres of water. The reaction mixture was then boiled for 2 hours, and the product was removed continuously by way of a helix-packed distillation column.

There was obtained 35.67 grams of product of which 24.19 grams was ethylisopropylketone.

*Example 2*

The process of Example 1 was repeated using 94.5% pure 2-methylpentene-2. 35.84 grams of product was obtained of which 24.24 grams was ethylisopropylketone.

*Example 3*

The process of Example 1 was repeated using 34.21 grams of the following mixture:

| | Percent by wt. |
|---|---|
| 4-methylpentene-1 | 1 |
| 4-methylpentene-2 | 16 |
| 2-methylpentene-1 | 9.1 |
| 2-methylpentene-2 | 68.3 |
| Other hexenes | 5.6 |

36.2 grams of product was obtained containing 21.6 grams of ethylisopropylketone.

*Example 4*

A solution of 66.67 grams of bromine in 2000 millilitres of water was allowed to react slowly with a mixture containing 34.45 grams of 91% pure 2-methylpentene-2 in 500 millilitres of water. The products were then boiled under reflux for 5 hours and then subjected to steam distillation.

There was obtained 33.19 grams of product containing 26.6 grams of ethylisopropylketone.

*Example 5*

64.4 grams of bromine were added dropwise over 1½ hours to 34.45 grams of 91% pure 2-methylpentene-2 in 500 millilitres of water. After the addition was complete, a further 1500 millilitres of water were added and the mixture boiled under reflux for 4½ hours. Steam distillation then gave 32.49 grams of product containing 21.56 grams of ethylisopropylketone.

Example 6

To a vigorously stirred mixture of 99.5% pure 2-methylpentene-2 and an equal volume of water, maintained at about 20° C., was slowly added the theoretical quantity of bromine (0.4 M) in aqueous sodium bromide (0.4 N).

The resultant suspension was boiled under reflux for 2 hours and then distilled until no more organic material appeared in the distillate.

Ethylisopropylketone was obtained in 85% wt. yield based on the weight of olefin used.

The aqueous residue was concentrated by distillation until it contained about 5 N hydrogenbromide and 2.5 N sodium bromide and then contacted with oxygen and oxides of nitrogen at 100° C. The conversion of hydrogen bromide to bromine was 95% and by suitable dilution of the reacted solution the original reagent was regenerated

Example 7

Pure 2-methylpentene-2 was allowed to react, as described in Example 6, with a solution of bromine (0.55 M) in aqueous hydrogen bromide (0.5 N) and sodium bromide (0.8 N).

Ethylisopropylketone was obtained in 90% wt. yield based on olefin used.

The aqueous residue (1.6 N hydrogen bromide/0.8 N sodium bromide) was oxidised with oxygen in the presence of oxides of nitrogen to give 0.5 N hydogen bromide in 0.8 N sodium bromide.

By addition of some bromine to this solution there was obtained a solution which could be recycled and reacted with further feed olefin.

I claim:
1. A process for the production of a ketone comprising the steps of: reacting an olefin having the formula

$$R(R_1)C=C(R_2)H$$

where R, $R_1$ and $R_2$ are alkyl groups, at reflux temperature with an aqueous solution containing 0.5–1 mol of bromine, 0.5–0.6 N hydrogen bromide and 0.4–1 N alkali metal bromide, recovering from the reaction products a ketone of formula $R(R_1)C.CO.R_2$, and regenerating the aqueous residue remaining after recovery of said ketone by oxidizing said aqueous residue with oxygen in the presence of oxides of nitrogen to reconstitute the initial aqueous solution.

2. A process according to claim 1 wherein, the reactants are boiled under reflux for 1–10 hours.

3. A process according to claim 1 wherein, the olefin is 2-methylpentene-2 and the ketone recovered being ethyl isopropyl ketone.

References Cited by the Examiner
UNITED STATES PATENTS 2,060,086 11/1936 Kautter _____ 260—597
2,856,430 10/1958 Elam _____ 260—597

LEON ZITVER, *Primary Examiner.*

DANIEL D. HORWITZ, *Examiner.*